United States Patent [19]

Davidson

[11] 4,250,232
[45] Feb. 10, 1981

[54] SAFETY ENCLOSURE ASSEMBLY FOR STORAGE BATTERIES

[76] Inventor: J. E. Davidson, 242 Thompsonville Rd., McMurray, Pa. 15317

[21] Appl. No.: 40,402

[22] Filed: May 18, 1979

[51] Int. Cl.³ .............................................. H01M 2/12
[52] U.S. Cl. ...................................... 429/56; 429/176
[58] Field of Search .................. 429/56, 82, 86, 87, 429/88, 89, 175, 176

[56] References Cited

U.S. PATENT DOCUMENTS

| | | | |
|---|---|---|---|
| 1,613,955 | 1/1927 | Lesley | 429/89 |
| 2,937,223 | 5/1960 | Thompson | 429/89 |
| 3,204,156 | 8/1965 | Moresi et al. | 429/82 |
| 3,219,488 | 11/1965 | Southworth | 429/82 |
| 3,329,531 | 7/1967 | Hennen | 429/88 |
| 3,388,007 | 6/1968 | Fiandt | 429/176 |
| 4,113,925 | 9/1978 | Kohler et al. | 429/89 |

Primary Examiner—Donald L. Walton
Attorney, Agent, or Firm—Paul Bogdon

[57] ABSTRACT

A safety enclosure assembly for electric storage batteries of the type used in the operation of motor vehicles, marine vessels and the like is disclosed. The assembly includes a casing or container of familiar size and shape having the usual number of cells for receiving the battery plate assemblies and electrolyte. A gas diverter is provided for each cell and is in the form of a blow-out section or flap formed in the side wall of the casing. The flaps are formed by scoring the casing wall to the shape of the flaps whereby the flaps will be forced open in the event of an explosion within the case. A channel piece is fixed to the casing to form a passageway for directing any high pressure explosion gases and electrolyte downwardly towards the base of the casing. The enclosure assembly also includes cell filler units each of which has a cup-shaped well having flame arrester openings through its bottom and gas vent openings through its side wall. Each cell filler unit is closed by a vent plug having a disc-shaped cap with a hollow plug secured thereto. The plug is also provided with flame arrester openings which also serve to pass vent gases flowing from the vent openings in the well. The cover for the container is provided with strengthening ribs on its underside and strengthening flanges at the regions where the cover is secured to the casing. The ribs and flanges serve to maintain the cover intact in the event of an internal explosion insuring that the safety flaps blow out whereby the high pressure gases are diverted downwardly of the casing.

7 Claims, 7 Drawing Figures

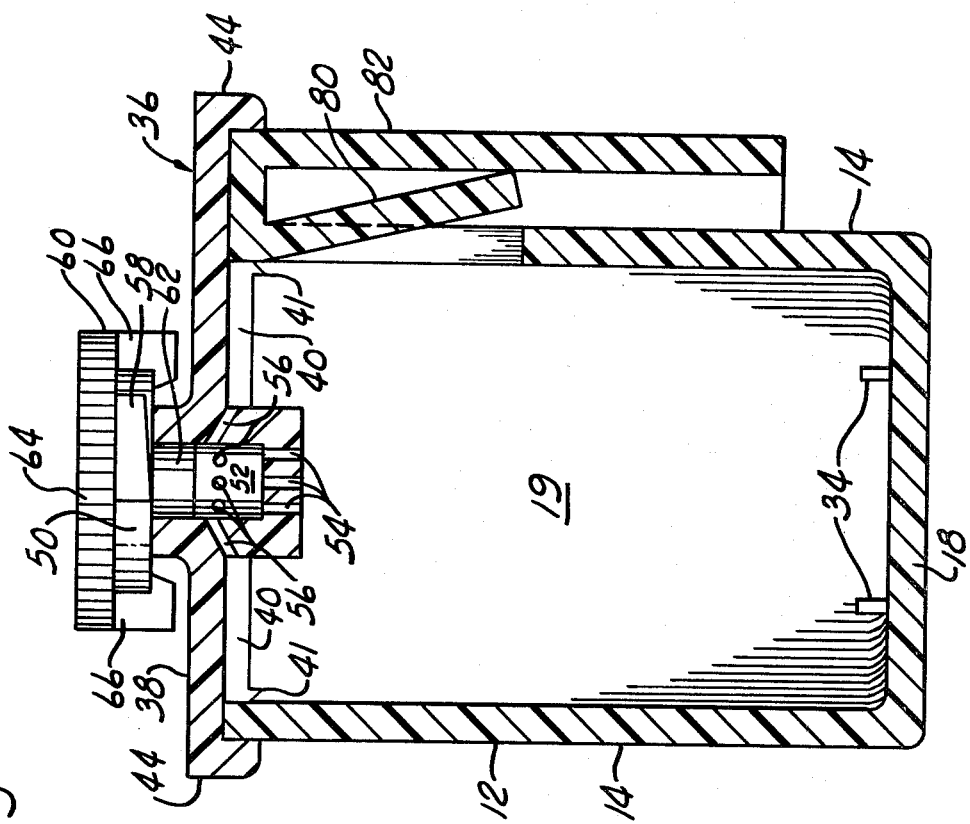
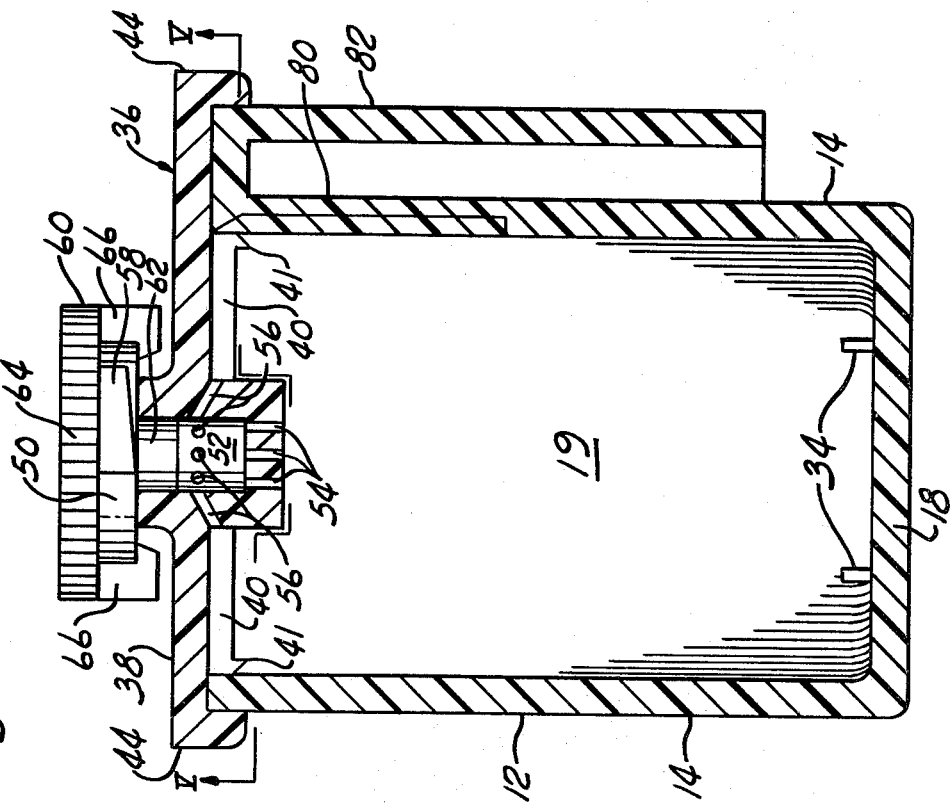

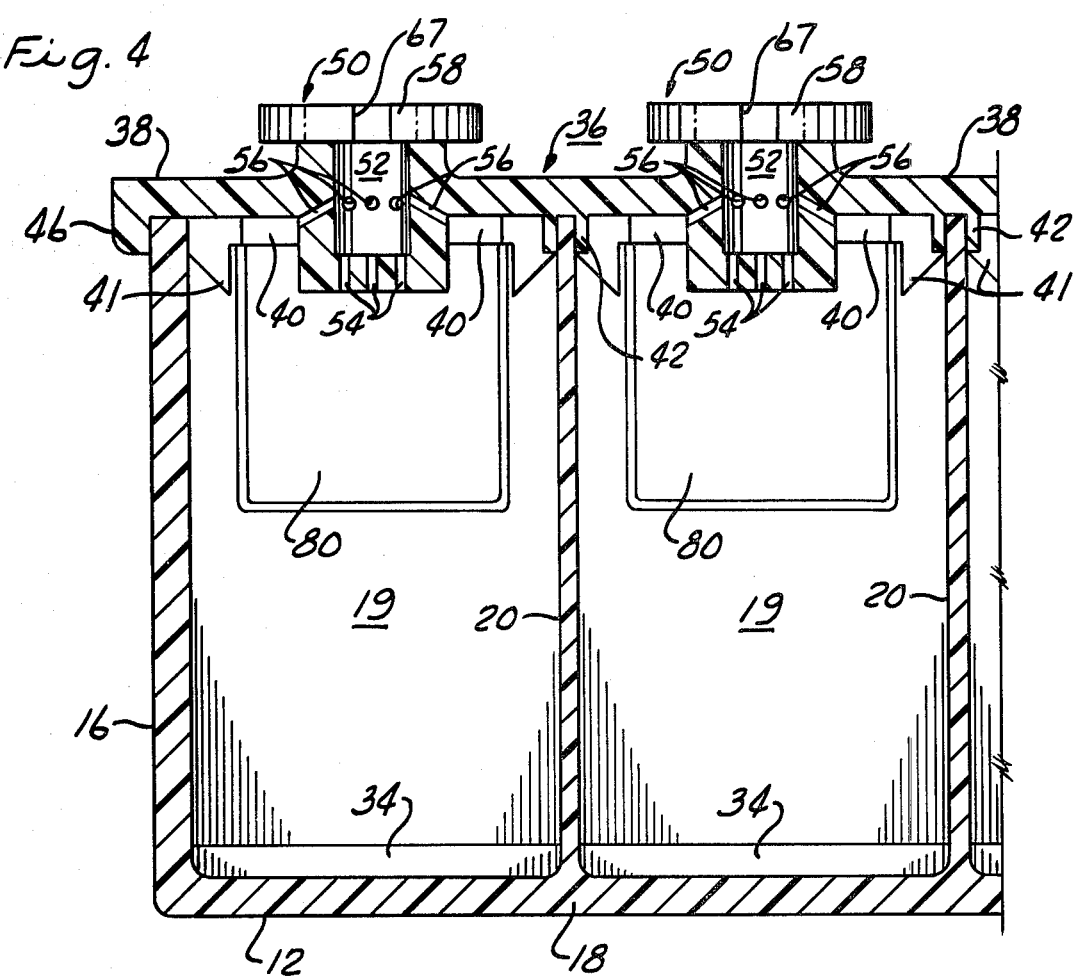
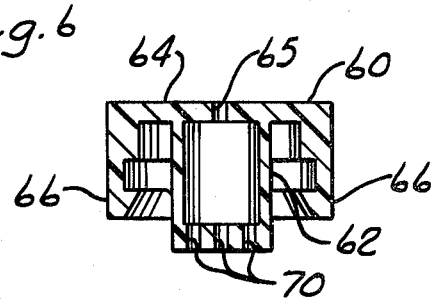
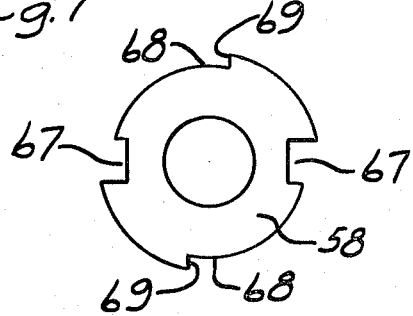

SAFETY ENCLOSURE ASSEMBLY FOR STORAGE BATTERIES

BACKGROUND OF THE INVENTION

This invention relates to improvements in casings or enclosures for electric storage batteries, such as lead-acid batteries used in the operation of motor vehicles, marine vessels, and the like. More particularly this invention pertains to an enclosure assembly which will prevent, contain and safely direct the force of any storage battery explosion.

As is well known an explosive gas is generated during the charging cycles of storage batteries such as lead-acid batteries which are commonly used in motor vehicles. When a battery is charging hydrogen and oxygen gases are formed. Should that combination of gases accumulate and come in contact with a spark or flame an explosion could result causing destruction to the battery and adjacent property. Should a person be near the explosion he or she could be seriously injured. Thus, lead-acid batteries have an inherent safety hazard not commonly recognized by battery users. Even batteries which use plates formed of lead-calcium alloys which reduce the evolution of hydrogen and oxygen are not totally safe.

Although the explosion hazard exits, it is not fully appreciated by battery users probably because battery explosions, fortunately, do not occur too frequently and when they do very little publicity is given to them. But, it is a fact that battery explosions have and do occur and people have been injured as a result. Thus, batteries should be made safer than they are so as to avoid physical injuries. Very little, if anything at all, has been done to prevent, contain, or direct the force of battery explosions. This invention provides a safe battery which prevents, contains, or directs the force of an explosion and thereby greatly reduces the chances or injury to people and damage to property.

I have found during the course of my analysis and examination of a storage battery after a hydrogen-oxygen gas explosion, that the cover is considerably weaker than the casing. In that case the force of the explosion caused the cover to shatter resulting, unfortunately, in eye and facial injuries to a person who was near the battery at the time of the explosion. My invention, in one of its forms, overcomes that cover weakness thereby resulting in a battery enclosure which will tend to contain all explosions. It is noted that internal explosions may result when accumulated hydrogen and oxygen is ignited from an internal spark caused by short circuits between the plates or broken post straps, for example. Also, an external flame entering the battery cells through the fill holes could ignite the gases.

Even with my improved cover for the battery enclosures, all internal explosions could not be safely contained. Thus, it becomes necessary to direct the force of intense explosions away from the area where people would generally be located. My invention, in another form, provides structure which results in the force of an explosion being diverted downwardly and thus away from any person.

My invention also provides structure which will prevent battery explosions caused by an external flame entering the battery cells through the fill holes. The same structure results in efficient venting of the potentially explosive gases from the battery thereby reducing the chances of internally ignited explosions.

SUMMARY OF THE INVENTION

This invention provides a novel casing or enclosure assembly for storage batteries which in its preferred form comprises: an elongated container having interconnected side walls, end walls and a base, and a series of cells defined by cell walls arranged within the confines of the container; gas diverter means for directing the flow of high pressure gases from any of the cells externally of the container and downwardly towards the base; a rib-strengthened cover for closing the top of the container; fill opening means defined in the cover communicating with each of the cells for receiving and directing liquids into the cells and for arresting the flame of any burning gases passing therethrough; and removable cap means for closing the fill opening means and for permitting the discharge of gases from the cells. The effect of containing low grade explosions results from my rib-strengthened cover which in its preferred form has a cross-hatched or diamond pattern of ribs molded to its underside. I also provide a uniformly thick and smooth surfaced cover which is devoid of any stress riser elements, particularly in the area of its perimeter. My cover is also provided with flange elements which are arranged to mate with the walls to which the cover is secured. The flanges add strength to the cover and increases the effective area of the cemented joint to give greater retention against forces of explosion.

My gas diverter means results in the high pressure explosive gases being safely directed down and away from the battery enclosure. While my strengthened cover will contain some types of explosion it will not contain an intense explosion. Combined with my gas diverter means my cover will prevent upwardly directed forces of explosion. In one embodiment of my invention, the gas diverter means includes a blow-out flap for each cell formed by scoring a generally U-shaped section in an upper region of a side wall of the enclosure. A high level explosion will cause the flaps to shear at the scored regions and blow-out to form openings for the explosion products to flow. The force of the explosion is directed downwardly by a channel piece, closed at the top and open at the bottom, molded to the blow-out flap enclosure sidewall.

My novel safety enclosure reduces the probability of explosions by providing a fill opening means and closing cap which together efficiently vent internal gases preventing explosive gas accumulation and at the same time squelch any flames entering through the fill openings. My fill opening means, in one form, is a cup-shaped well having a series of small diameter openings through its lower end. The well is also provided with a series of vent openings around a mid-section of its side wall. The cap has a hollow plug secured to a disc-shaped top which has a vent opening through its center. The lower end of the plug is also provided with a series of small diameter openings. Thus, any flame entering through the plug will be squelched in the manner of the well known Davy safety lamp. Any internal gases will be readily discharged through all of the communicating openings provided through the well and cap.

Various other advantages, details and modifications of my present invention will become apparent as the following description of a certain present preferred embodiment proceeds.

DESCRIPTION OF THE DRAWINGS

In the accompanying drawings I show a certain present preferred embodiment of my invention in which:

FIG. 2 is a section view through one end of a cell of the battery of FIG. 1 showing details of construction of various elements of the present invention;

FIG. 3 is a view similar to that of FIG. 2 showing the blow-out section pivoted to its open position as would happen as the result of an explosion within the battery;

FIG. 4 is a side elevation view in section of two cells of the battery of FIG. 1 without the plates showing more details of construction of the present invention;

FIG. 6 is a section view of a filler plug showing details of construction; and

FIG. 7 is a plan view of the top flange of a filler well showing details of construction.

DESCRIPTION OF A PREFERRED EMBODIMENT

Figure 1:
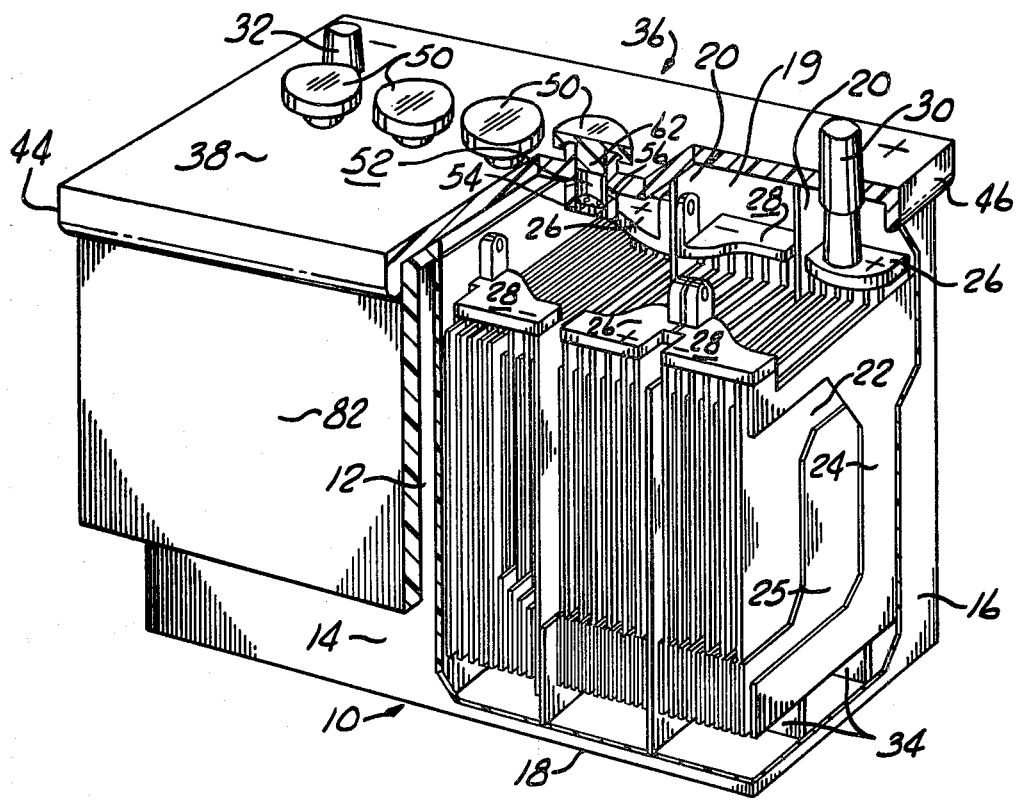
FIG. 1 is a perspective view of an electric storage battery of the type used in motor vehicles embodying the present invention, with parts cut away to show details of construction.

Referring now to the drawings, there is shown a lead-acid electric storage battery 10 of the type generally used in motor vehicles. The battery 10 includes an elongated box-shaped casing or container 12 molded from a suitable material such as polypropylene, having interconnected side walls 14, end walls, 16, and base 18. A series of cells 19 is formed within the container 12 by transversely extending, longitudinally spaced partitions or cell walls 20 which are molded to the side walls 14 and base 18. The cells 19 contain the alternating positive plate 22—negative plate 24 groupings or sets. The positive plates 22 are separated from the negative plates by non-conducting separators 25 with the positive plates being connected by positive post straps 26 and the negative plates being connected by negative post straps 28. A set of positive plates 22 in one cell 19 is connected to a set of negative plates 24 in an adjacent cell through suitable connectors between respective positive post straps 26 and negative post straps 28. Opposite end sets of positive and negative plates 22 and 24 are fixed through their respective post straps 26 and 28 to terminal posts 30 and 32. All sets of positive and negative plates 22 and 24 rest on element rests 34 molded to the base 18 of the container 12.

Figure 5:
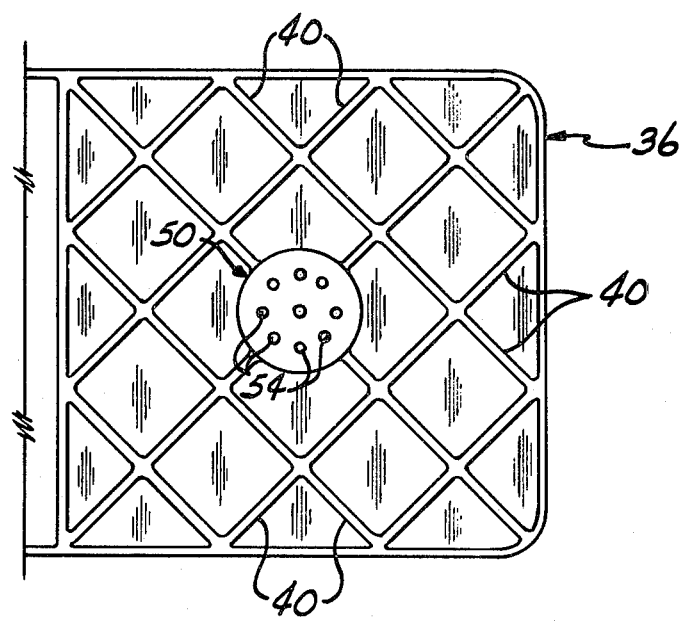
FIG. 5 is a sectional view looking along the line V—V of FIG. 2 showing the underside of the cover and the particularly the cross-hatch pattern of the strengthening ribs.

The container 12 is closed by a cover 36 which has a generally flat upper surface 38 and an undersurface provided with cross-hatched or diamond patterned, strengthening ribs 40, shown clearly in FIG. 5. The cover 36 which is also formed by molding a suitable polypropylene material is provided with strengthening flanges 42, as clearly shown in FIG. 4, formed to fit snugly over upper end sections of the cell walls 20. The sides and ends of the cover 36 are provided with downwardly extending side flanges 44 and end flanges 46, respectively, which overlap in snug relationship the upper end sections of the side walls 14 and end walls 16, respectively, of the container 12. One side flange 44 of the cover 36 snugly overlaps the upper end of a gas diverter channel which will be more fully explained and described hereinafter.

The cover 36 is smooth and generally uniformly thick. The cover 36 is secured to the container 12 by a suitable cement applied between the flanges 42, 44, and 46 and the respective mating cell walls 20, side walls 14, and end walls 16. By providing the flanges 42, 44, and 46 to the cover 36, a large effective area of cemented joint is provided which strengthens the retention capability of the cover 36 against explosion forces generated within the battery 10. The explosion force retention capability of the cover is also strengthened by the ribs 40 which need not be very heavy. The ribs 40 may, for example, be between 0.050 and 0.060 inches thick and about ¼ inch deep depending on the size of the cover 36 and the material used to form the cover. The ribs 40 may also be provided with guides 41 on the ends of the ribs for aiding the assembly of the cover 36 to the container 12.

The cover 36 supports a fill opening assembly 50 for each cell 19. The fill opening assemblies 50 serve to receive and direct electrolyte liquid into the cells and to direct and discharge any gases generated within the cells. Each fill opening assembly 50 includes a cup-shaped filler well 52 molded to the cover 36, with the top or open end of the well extending above the upper surface of the cover and the lower end of the well extending below the underside of the cover to a point adjacent the top of the positive-negative plate 22-24 set. The bottom end of the filler well 52 has a series of small diameter openings 54 formed therethrough. The openings 54 are suitably sized and grouped to permit the flow of electrolyte or water into the cells 19 and also to arrest any flame which would enter through the upper end of the well 52. The group of openings 54 acts as a flame-arrestor in the manner of the Davy safety lamp. The openings 54 also serve as discharges for gases emanating from the cells 19. Venting of cell gases is also served by inclined passages 56 formed through an intermediate section of the well 52. The passages 56 are formed to open at points just beneath the underside of the cover 36.

The top of each filler well 52 is provided with an outwardly extending annular flange 58 having a slot and cam construction, shown clearly in FIG. 7, for receiving a push and twist-type filler plug 60. The filler cap 60 has a hollow generally closed ended, cylindrically shaped main body 62 sized to be snugly received in a filler well 52 with the lower end of the main body reaching a point just above the vent passages 56 of the well. The upper end of the main body 62 is connected to a disc-shaped cap 64 having an axially located vent opening 65 therethrough communicating with the hollow interior of the main body 62. The cap 64 has secured to its underside a pair of oppositely arranged cam-follower arms 66 shaped to fit into the slots 67 of the flange 58 and to ride downwardly on the cam ramps 68 when the filler plug 60 is turned in a clockwise direction and to ultimately reach the cam stops 69 at which point the plugs 60 will be locked to the filler well 52. Turning the filler plug 60 in a counterclockwise direction from its locked position will result in the cam-follower arms 66 aligning with the slots 67 at which point the plug may be removed by pulling it up from the filler well 52. The twist-lock construction of the filler plug 60 and filler well 52 serves to secure the plugs in place in the event of an explosion with the battery 10.

As clearly shown in FIG. 6, the main body 62 of each filler plug 60 has a series of small diameter, closely spaced openings 70 provided through its lower end.

The group of openings 70 serve the same safety functions as the group of openings 54 in each filler well 52, that is they serve as passage for venting gases from a cell 19 and for arresting any flame entering the filler plug 60 through the vent opening 65 of the cap 64.

Each cell 19 of the container 12 is provided with a gas diverter for safely directing high pressure gases of a high level internal explosion. Each gas diverter includes a generally U-shaped blow-out section 80 formed in an upper region of one section of side wall 14 which forms one side of the cell. This blow-out section 80 is integral with the side wall 14 and differs in that it has a peripheral thickness less than that of the remainder of the side wall. The blow-out section 80 would be formed by scoring its periphery to such a thickness where the section 80 will pivot outwardly, as shown in FIG. 3, whenever an internal battery pressure of a predetermined magnitude is reached such as would be realized as the result of a serious gas explosion. A channel member 82 is molded in the entire upper end section of the side wall 14 in which the blow-out sections 80 are provided. The channel member 82 is closed at its top and open at its bottom which is disposed a few inches above the base 18 of the container 12. Thus, high pressure gases from a serious internal explosion will exit the battery casing from anyone or all of the blow-out sections 80 and will be discharged downwardly of the battery and away from any person who would happen to be near the battery at the time of the explosion.

It should now be clearly understood how my present invention provides a safety enclosure for storage batteries which serves to contain, prevent, and direct the force of any battery explosion. It should also be understood that my safety enclosure may be economically produced so as to be affordable in the battery marketplace. None of the inventive features of my present invention is complex. Rather all aspects of my inventions are simple in construction and thus capable of economical production.

While I have shown and described a present preferred embodiment of this invention, it is be distinctly understood that the invention is not limited thereto, but may be otherwise embodied within the scope of the following claims.

I claim:

1. Safety enclosure assembly for storage batteries, comprising:

an elongated container having interconnecting side walls, end walls and a base, and including a series of cells defined by cell walls arranged within the confines of the container;

gas diverter means for directing and containing the flow of high pressure gases above a predetermined magnitude from any of the upper regions of any of said cells externally of said container and downwardly along at least one of said side walls of said container and toward said base; said gas diverter means including a blow-out section formed on the upper regions of a side wall of said container, constructed and arranged such that said sections will be displaced outwardly of the side wall at a predetermined internal gas pressure to form an opening, and channel means secured to said container defining a downwardly directed passageway for said blow-out sections;

rib-strengthened cover means for closing the top of said container;

fill opening means defined in said cover means communicating with each of said cells for receiving and directing liquids into said cells and for arresting the flame of any burning gases passing therethrough; and removable cap means for closing the fill opening means and for permitting the discharge of gases from said cells.

2. A safety enclosure as set forth in claim 1 wherein said fill opening means includes a cup-shaped filler well having a generally closed bottom extending into an upper region of a said cell and defining a plurality of flame-arresting openings therethrough communicating with a said cell and the interior of the filler well.

3. A safety enclosure as set forth in claim 2 wherein the side wall of said filler well includes a series of vent passages extending through an intermediate region thereof and communicating between a said cell and the interior of the filler well.

4. A safety enclosure as set forth in claim 2 wherein said cap means includes an upper disc-shaped cap having an axially extending vent opening therethrough and a hollow plug extending downwardly therefrom and sized to reach a level above the bottom of said filler well; said plug having a generally closed bottom with a plurality of flame-arresting openings therethrough.

5. A safety enclosure as set forth in claim 1 wherein said cover means includes strengthening flange members molded to the underside thereof and arranged to snugly fit over the upper portions of the side and end walls of said container to which said cover means is secured.

6. A safety enclosure as set forth in claim 1 wherein said cover means includes a plurality of strengthening ribs molded to the underside thereof.

7. In an enclosure assembly for storage batteries, including a container having interconnected side walls, end walls and a base, and a series of cells defined by cell walls arranged within the confines of the container; a cover for closing the top of the container; a gas safety release assembly; and fill opening means including removable caps; the improvement therewith in said gas safety release assembly comprising:

gas diverter means responsive to high pressures above a predetermined magnitude for directing and containing the flow of high pressure gases from the upper regions of any of the cells of the container externally of the container and downwardly along at least one of the side walls of the container and towards said base, said gas diverter means including a blow-out section formed in the upper region of a side wall of the container constructed and arranged such that said section will be displaced outwardly of the side wall at a predetermined internal gas pressure to form an opening, and channel means secured to the container defining a downwardly directed passageway for said blow-out section.

* * * * *